(12) United States Patent
Mager et al.

(10) Patent No.: US 7,927,704 B2
(45) Date of Patent: Apr. 19, 2011

(54) TWO-COMPONENT SYSTEMS FOR PRODUCING FLEXIBLE COATINGS

(75) Inventors: Michael Mager, Leverkusen (DE); Meike Niesten, Köln (DE); Malte Homann, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 500 days.

(21) Appl. No.: 11/524,001

(22) Filed: Sep. 20, 2006

(65) Prior Publication Data

US 2007/0078255 A1 Apr. 5, 2007

(30) Foreign Application Priority Data

Oct. 4, 2005 (DE) .......................... 10 2005 047 562

(51) Int. Cl.
*B32B 27/40* (2006.01)
*B05D 3/02* (2006.01)
(52) U.S. Cl. ........................ 428/423.1; 528/61
(58) Field of Classification Search ............... 428/423.1; 528/59, 60, 61
See application file for complete search history.

(56) References Cited

U.S. PATENT DOCUMENTS

| | | | |
|---|---|---|---|
| 3,420,800 A | 1/1969 | Haggis | |
| 3,428,610 A | 2/1969 | Klebert | 260/75 |
| 3,488,324 A | 1/1970 | Garber et al. | |
| 3,567,692 A | 3/1971 | Haggis | |
| 3,634,544 A | 1/1972 | Takeda et al. | |
| 3,655,628 A | 4/1972 | Uchida et al. | |
| 3,725,353 A | 4/1973 | Fujimoto et al. | |
| 3,761,451 A | 9/1973 | Fujimoto et al. | |
| 3,769,318 A | 10/1973 | Windemuth et al. | |
| 3,932,359 A * | 1/1976 | Fujimoto et al. | 442/153 |
| 4,160,080 A | 7/1979 | Köenig et al. | 528/59 |
| 4,177,342 A | 12/1979 | Bock et al. | |
| 4,463,126 A | 7/1984 | Gruber et al. | 524/589 |
| 4,810,820 A | 3/1989 | Slack et al. | |
| 5,124,427 A | 6/1992 | Potter et al. | |
| 5,126,170 A | 6/1992 | Zwiener et al. | 427/385.5 |
| 5,214,086 A | 5/1993 | Mormile et al. | |
| 5,235,018 A * | 8/1993 | Potter et al. | 528/49 |
| 5,236,741 A | 8/1993 | Zwiener et al. | 427/385.5 |
| 5,466,771 A | 11/1995 | Hicks et al. | |
| 5,516,873 A * | 5/1996 | Hicks et al. | 528/60 |
| 5,523,376 A | 6/1996 | Hicks et al. | |
| 5,736,604 A * | 4/1998 | Luthra | 524/591 |
| 5,859,163 A * | 1/1999 | Slack et al. | 528/49 |
| 6,183,870 B1 | 2/2001 | Hergenrother et al. | 428/423.1 |
| 6,392,001 B1 | 5/2002 | Mertes et al. | |
| 6,426,414 B1 | 7/2002 | Laas et al. | 544/222 |
| 6,562,894 B1 | 5/2003 | Blum et al. | 524/507 |
| 6,706,801 B1 | 3/2004 | Blum et al. | 524/507 |
| 7,253,252 B2 * | 8/2007 | Kohler et al. | 528/328 |
| 2004/0067315 A1 | 4/2004 | Niesten et al. | 427/372.2 |

FOREIGN PATENT DOCUMENTS

| | | |
|---|---|---|
| DE | 4416321 A1 | 11/1995 |
| DE | 196 44 932 A1 | 10/1997 |
| GB | 994890 A | 6/1965 |

* cited by examiner

*Primary Examiner* — Thao T. Tran
(74) *Attorney, Agent, or Firm* — Connolly Bove Lodge & Hutz LLP

(57) ABSTRACT

The present invention relates to two-component coating systems for producing flexible coatings. The coating systems comprise polyurethane prepolymers with allophanate structures and also amino-functional polyaspartic esters as curing agents.

10 Claims, No Drawings

TWO-COMPONENT SYSTEMS FOR PRODUCING FLEXIBLE COATINGS

BACKGROUND OF THE INVENTION

1. Field of the Invention

The present invention relates to two-component coating systems for producing flexible coatings. The coating systems comprise polyurethane prepolymers with allophanate structures and also amino-functional polyaspartic esters as curing agents.

2. Description of Related Art

Polyurethane-based or polyurea-based. two-component coating systems are known and used in the art. In general they include a liquid polyisocyanate component and a liquid, isocyanate-reactive component. Reaction of polyisocyanates with amines as an isocyanates-reactive component produces highly crosslinked polyurea coatings. Primary amines and isocyanates, however, usually react very rapidly with one another. Typical potlifes or gelling times often amount only to several seconds to a few minutes. Consequently these polyurea coatings cannot be applied manually, but only with special spraying apparatus. Such coatings, however, possess excellent physical properties.

One method from the literature of reducing the reactivity is to use prepolymers having a low NCO content. Through the use of NCO-functional prepolymers in combination with amines it is possible to produce flexible polyurea coatings.

U.S. Pat. No. 3,428,610 and U.S. Pat. No. 4,463,126 disclose the preparation of polyurethane/polyurea elastomers by curing NCO-functional prepolymers with aromatic diamines. These are preferably diprimary aromatic diamines, having at least one alkyl substituent of 2-3 carbon atoms positioned ortho to each amino group, and optionally also having methyl substituents in further positions ortho to the amino groups, such as, for example, diethyltolyldiamine (DETDA). U.S. Pat. No. 4,463,126 describes a process for producing solvent-free elastic coatings which involves curing NCO prepolymers based on isophorone diisocyanate (IPDI) and polyether polyols at room temperature using sterically hindered diprimary aromatic diamines.

A disadvantage associated with such systems is that the aromatic diamines have a propensity towards severe yellowing.

A further option for retarding the reaction between polyisocyanates and amines is to use secondary amines. EP-A 403 921 and U.S. Pat. No. 5,126,170 disclose the formation of polyurea coatings by reaction of polyaspartic esters with polyisocyanates. Polyaspartic esters possess low viscosity and reduced reactivity towards polyisocyanates and can therefore be used for preparing solvent-free coating compositions having extended potlifes. An additional advantage of polyaspartic esters is that the products are colorless.

Colorless aliphatic polyisocyanate prepolymers based on polyether polyols, however, cure extremely slowly with polyaspartic esters, and the coatings often possess a tacky surface.

It is an object of the present invention to provide two-component coating compositions for producing polyurea coatings, said compositions having potlives long enough to enable even manual application and permitting the production of flexible coatings which are both clear and colorless and have good performance data such as elasticity and hardness.

This object has now been achieved through the combination of specific allophanate polyisocyanates with polyaspartic esters.

SUMMARY OF THE INVENTION

The present invention relates to two-component coating compositions containing
A) a polyisocyanate prepolymer having polyether groups attached via allophanate groups and
B) an amino-functional polyaspartic ester of formula I)

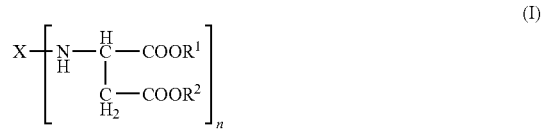

wherein
X is an n-valent organic radical obtained by removing the primary amino groups from an n-valent polyamine,
$R^1$ and $R^2$ are identical or different organic radicals which are inert towards isocyanate groups under the reaction conditions and
n is a whole number of at least 2.

DETAILED DESCRIPTION OF THE INVENTION

The allophanate group-containing prepolymers used in component A) are obtained by reacting
A1) one or more aliphatic and/or cycloaliphatic polyisocyanates with
A2) a polyhydroxy component containing at least one polyether polyol, to provide an NCO-functional polyurethane prepolymer and subsequently subjecting the urethane groups to partial or complete allophanatization with the addition of
A3) aliphatic or cycloaliphatic polyisocyanates, which are the same or different from polyisocyanates A1),
A4) allophanate catalysts and
A5) optionally stabilizers.

Examples of suitable aliphatic and cycloaliphatic polyisocyanates A1) include diisocyanates or triisocyanates such as butane diisocyanate, pentane diisocyanate, hexane diisocyanate (hexamethylene diisocyanate, HDI), 4-isocyanatomethyl-octane 1,8-diisocyanate (triisocyanatononane, TIN), 4,4'-methylenebis(cyclohexyl isocyanate), 3,5,5-trimethyl-1-isocyanato-3-isocyanatomethylcyclohexane (isophorone diisocyanate, IPDI) and also ω,ω'-diisocyanato-1,3-dimethylcyclohexane ($H_6XDI$).

In components A1) to A3) it is preferred to use hexane diisocyanate (hexamethylene diisocyanate, HDI), 4,4'-methylenebis(cyclohexyl isocyanate) and/or 3,5,5-trimethyl-1-isocyanato-3-isocyanatomethylcyclohexane (isophorone diisocyanate, IPDI) as polyisocyanates. An especially preferred polyisocyanate is HDI. In components A1) and A3) it is preferred to use polyisocyanates of the same type.

Suitable polyhydroxy compounds of component A2) include all of the known polyhydroxy compounds, which preferably have an average OH functionality of greater than or equal to 1.5, provided that at least one of the compounds contained in component A2) is a polyether polyol.

Suitable polyhydroxy compounds which can be employed in component A2) are low molecular weight diols (e.g. 1,2-ethanediol, 1,3- and 1,2-propanediol, and 1,4-butanediol); triols (e.g. glycerol and trimethylolpropane); and tetraoles (e.g. pentaerythritol); polyether polyols; polyester polyols; polycarbonate polyols; and polythioether polyols. In component A2) it is preferred to exclusively use polyether polyols as the polyhydroxy component.

The polyether polyols employed in component A2) preferably have number average molecular weights $M_n$ of 300 to 20,000 g/mol, more preferably 1000 to 12,000, and most preferably 2000 to 6000 g/mol. They preferably have an average OH functionality of $\geq 1.5$, more preferably $\geq 1.90$, and most preferably $\geq 1.95$. These polyether polyols are obtained in known manner by the alkoxylation of suitable starter molecules under base catalysis or with the use of double metal cyanide compounds (DMC compounds).

Preferred polyether polyols of component A2) are those having an unsaturated end group content of less than or equal to 0.02 milliequivalents per gram of polyol (meq/g), more preferably less than or equal to 0.015 meq/g, and most preferably less than or equal to 0.01 meq/g (determination method: ASTM D2849-69).

These polyether polyols are prepared in known manner by the alkoxylation of suitable starter molecules, in particular with use of double metal cyanide catalysts (DMC catalysis). This is described, for example, in U.S. Pat. No. 5,158,922 (e.g. Example 30) and EP-A 0 654 302 302 (p. 5, 1.26 to p. 6, 1.32).

Suitable starter molecules for the preparation of the polyether polyols include low molecular weight monomeric polyols, water, organic polyamines having at least two N—H bonds, or mixtures of these starter molecules. Alkylene oxides suitable for the alkoxylation are preferably ethylene oxide and/or propylene oxide, which can be employed in any order or in admixture in the alkoxylation.

Preferred starter molecules for preparing polyether polyols by alkoxylation, in particular by the DMC method, include monomeric polyols such as ethylene glycol, propylene 1,3-glycol, butane-1,4-diol, hexane-1,6-diol, neopentyl glycol, 2-ethylhexane-1,3-diol, glycerol, trimethylolpropane and pentaerythritol, and also low molecular weight, hydroxyl-containing esters of these polyols with the dicarboxylic acids described below, or low molecular weight ethoxylation or propoxylation products of these monomeric polyols, or desired mixtures of these modified or non-modified alcohols.

The polyurethane prepolymers containing isocyanate groups are prepared by reacting the polyhydroxy compounds of component A2) with excess amounts of polyisocyanates A1). The reaction takes place preferably at temperatures from 20 to 140° C., more preferably at 40 to 110° C., optionally with the use of the known catalysts from polyurethane chemistry, such as tin soaps, e.g. dibutyltin dilaurate, or tertiary amines, e.g. triethylamine or diazabicyclooctane.

The allophanatization then takes place subsequently by reaction of the resulting polyurethane prepolymers containing isocyanate groups with polyisocyanates A3), which may be the same as or different from those of component A1), with the addition of suitable catalysts A4) for the allophanatization. Preferably then acidic additives of component A5) are added for the purpose of stabilization, and excess polyisocyanates are removed from the product, for example, by thin-film distillation or extraction.

The equivalent ratio of the OH groups of the compounds of component A2) to the NCO groups of the polyisocyanates from A1) and A3) is preferably 1:1.5 to 1:20, more preferably 1:2 to 1:15, and most preferably 1:2 to 1:10.

For allophanatization zinc(II) compounds are preferably used as catalysts A4), more preferably, zinc soaps of relatively long-chain, branched or unbranched, aliphatic carboxylic acids. Preferred zinc(II) soaps are those based on 2-ethylhexanoic acid or on the linear aliphatic $C_4$ to $C_{30}$ carboxylic acids. Very particularly preferred compounds A4) are Zn(II) bis(2-ethylhexanoate), Zn(II) bis(n-octoate), Zn(II) bis(stearate) or mixtures thereof. The allophanatization catalysts are preferably employed in amounts of 5 ppm to 5% by weight, more preferably 5 to 500 ppm, and most preferably 20 to 200 ppm, based on the reaction mixture as a whole.

Optionally, it is possible to use additives having a stabilizing action, before, during or after the allophanatization. These may be acidic additives such as Lewis acids (electron deficiency compounds) or Broenstedt acids (protonic acids) or compounds which release such acids on reaction with water. Examples include organic or inorganic acids or neutral compounds such as acid halides or esters which react with water to form the corresponding acids. Examples include hydrochloric acid, phosphoric acid, phosphoric esters, benzoyl chloride, isophthaloyl dichloride, p-toluenesulphonic acid, formic acid, acetic acid, dichloroacetic acid and 2-chloropropionic acid.

The acidic additives may also be used to deactivate the allophanatization catalyst. They also improve the stability of the allophanates prepared in accordance with the invention during thermal exposure in the course of thin-film distillation or during storage of the products, for example. The acidic additives are generally added in an amount such that the molar ratio of the acidic centers of the acidic additive and of the catalyst is at least 1:1. Preferably, however, an excess of the acidic additive is added. When acidic additives are used, they are preferably organic acids such as carboxylic acids or acid halides such as benzoyl chloride or isophthaloyl dichloride.

Excess monomeric diisocyanate can be separated off, if desired, after the allophanatization has been concluded. Thin-film distillation is the preferred method for separation, and is preferably carried out at temperatures of 100 to 160° C. under a pressure of 0.01 to 3 mbar. The resulting residual monomer content (diisocyanate) is preferably less than 1% by weight, more preferably less than 0.5% by weight.

The process steps overall can be carried out optionally in the presence of inert solvents. Inert solvents are those which do not react with the reactants under the prevailing reaction conditions. Examples include ethyl acetate, butyl acetate, methoxypropyl acetate, methyl ethyl ketone, methyl isobutyl ketone, toluene, xylene, aromatic or (cyclo)aliphatic hydrocarbon mixtures or mixtures of these solvents. Preferably, however, the reactions according to the invention are carried out solvent-free.

The components involved can be added in any order both during the preparation of the prepolymers containing isocyanate groups and during allophanatization. It is preferred, however, to add polyether polyol component A2) to the initial polyisocyanate charge of components A1) and A3), and to then add the allophanatization catalyst A4).

In one preferred embodiment of the invention the polyisocyanates of components A1) and A3) are introduced as an initial charge in an appropriate reaction vessel and this initial charge is heated, with optional stirring, to 40 to 110° C. After the desired temperature has been reached, the polyhydroxy compounds of component A2) are then added with stirring and stirring is continued until the NCO content equals or is slightly below the theoretical NCO content of the polyurethane prepolymer based on the chosen stoichiometry. At this point the allophanatization catalyst A4) is added and the reaction mixture is heated at 50 to 100° C. until the NCO content equals or is slightly below the desired NCO content. Following addition of acidic additives as stabilizers A5), the reaction mixture is cooled or passed on directly for thin-film distillation. In that procedure the excess polyisocyanate is separated off at temperatures from 100 to 160° C. under a pressure of 0.01 to 3 mbar down to a residual monomer content of less than 1%, preferably less than 0.5%. After the thin-film distillation it is possible to add any further stabilizers.

The resulting allophanates A) preferably have number average molecular weights of 700 to 50,000 g/mol, more preferably 1500 to 8000 g/mol and most preferably 1500 to 4000 g/mol and have viscosities at 23° C. of 500 to 100,000 mPa·s, preferably 500 to 50,000 mPa·s, more preferably 1000 to 7500 mPa·s, and most preferably 1000 to 3500 mPa·s.

The allophanates preferably correspond to the formula II)

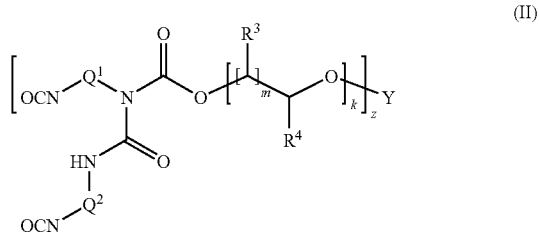

in which
wherein
$Q^1$ and $Q^2$ independently of one another represent the radical obtained by removing the isocyanate groups from a linear and/or cycloaliphatic diisocyanate, preferably those previously disclosed, and more preferably —$(CH_2)_6$—,
$R^3$ and $R^4$ independently of one another represent hydrogen or a $C_1$-$C_4$ alkyl radical, preferably hydrogen and/or a methyl group, wherein $R^3$ and $R^4$ may be different in each repeating unit k,
Y represents the radical obtained by removing the reactive hydrogen groups, preferably hydroxyl groups, from a polyether starter molecule having a functionality of 2 to 6,
z is 2 to 6, and may be a fractional number when starter molecules having different functionalities are used,
k has a value such that the number average molecular weight of the polyether on which the structure is based is 300 to 20,000 g/mol, and
m is 1 or 3.

Especially preferred allophanates are those corresponding to formula III)

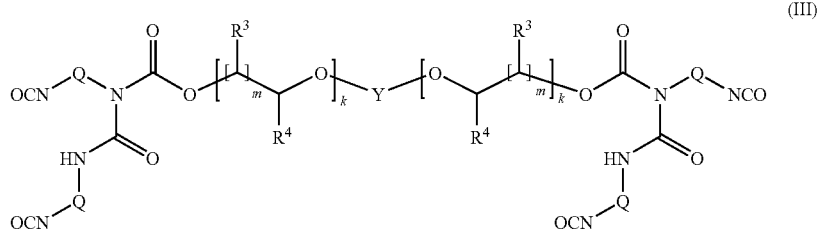

wherein
Q represents the radical obtained by removing the isocyanate groups from a linear and/or cycloaliphatic diisocyanate, preferably those previously disclosed, and more preferably —$(CH_2)_6$—,
$R^3$ and $R^4$ independently of one another represent hydrogen or a $C_1$-$C_4$ alkyl radical, preferably hydrogen and/or a methyl group, wherein $R^3$ and $R^4$ may be different in each repeating unit k, Y represents the radical obtained by removing the reactive hydrogen groups, preferably hydroxyl groups, from a difunctional polyether starter molecule, and
k has a value such that the number average molecular weight of the polyether on which the structure is based is 300 to 20,000 g/mol, and
m is 1 or 3.

When the allophanates of formulas II) and III) are prepared using polyols based on polymerized ethylene oxide, propylene oxide or tetrahydrofuran, in formulas II) and III), when n=1, preferably at least one of the radicals $R^1$ and $R^2$ is hydrogen, and when n=3, $R^1$ and $R^2$ are hydrogen.

The group X in formula (I) of the polyaspartic esters of component B) is based preferably on an n-valent polyamine selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3, 3,5-trimethyl-5-aminomethylcyclohexane, 2,4- and/or 2,6-hexahydrotolylene diamine, 2,4'- and/or 4,4'-diaminodicyclohexylmethane, 3,3'-dimethyl-4,4'-diaminodicyclohexylmethane, 2,4,4'-triamino-5-methyldicyclohexylmethane and polyether polyamines having aliphatically bound primary amino groups and a number average molecular weight $M_n$ of 148 to 6000 g/mol.

Preferably the group X is based on 1,4-diaminobutane, 1,6-diaminohexane, 2,2,4-and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

Regarding the radicals $R^1$ and $R^2$ the phrase "inert towards isocyanate groups under the reaction conditions" means that these radicals do not have groups containing Zerewitinoff-active hydrogen (CH acidic compounds; cf. Römpp Chemie Lexikon, Georg Thieme Verlag Stuttgart) such as OH, NH or SH.

$R^1$ and $R^2$ independently of one another are preferably $C_1$ to $C_{10}$ alkyl radicals, more preferably methyl or ethyl radicals. Where X is based on 2,4,4'-triamino-5-methyldicyclohexylmethane preferably $R^1$=$R^2$=ethyl. In formula (I) n is preferably a whole number from 2 to 6, more preferably 2 to 4.

The amino-functional polyaspartic esters B) are prepared in known manner by reacting the corresponding primary polyamines of the formula X—[NH$_2$]$_n$ with maleic or fumaric esters of the formula $R^1$OOC—CH=CH—COOR$^2$ Suitable polyamines are the diamines specified above as a basis for the group X. Examples of suitable maleic or fumaric esters are dimethyl maleate, diethyl maleate, dibutyl maleate and the corresponding fumaric esters.

The preparation of the amino-functional polyaspartic esters B) from the stated starting materials takes place preferably at a temperature of 0 to 100° C., the starting materials being employed in proportions such that for each primary amino group there is at least one, preferably exactly one, olefinic double bond. After the reaction any starting materials employed in excess may optionally be separated off, e.g. by distillation. The reaction may take place in bulk or in the presence of suitable solvents such as methanol, ethanol, propanol, dioxane or mixtures of these solvents.

In the two-component coating compositions of the invention the equivalent ratio of free or blocked amino groups to free NCO groups is preferably 0.5:1 to 1.5:1, more preferably 1:1 to 1.5:1.

The two-component coating compositions of the invention are prepared by mixing the individual components with one another. The stated coating compositions may be applied to surfaces by the conventional techniques such as spraying, dipping, flooding, rolling, brushing or pouring. After flashing off to remove any solvents present, the coatings are then cured under ambient conditions or at elevated temperatures of, for example, 40 to 200° C.

The coating compositions can be applied for example to metals, plastics, ceramic, glass and also natural substances. It is possible for the stated substrates to have been subjected beforehand to any pretreatment that may be necessary.

The invention is further illustrated but is not intended to be limited by the following examples in which all parts and percentages are by weight unless otherwise specified.

EXAMPLES

The NCO contents were determined by back-titrating di-n-butylamine added in excess with hydrochloric acid. The viscosities were determined using a rotation viscometer from Haake at 23° C.

Preparation of Prepolymer 1

2520.7 g of hexane 1,6-diisocyanate were first admixed with 90 mg of isophthaloyl dichloride and then the mixture was heated to 100° C. with stirring. At that point, over the course of 3 hours, 1978.5 g of a polypropylene glycol were added which had been prepared by DMC catalysis (base-free) (unsaturated groups content <0.01 meq/g, number average molecular weight 2000 g/mol, OH number 56, theoretical functionality 2). The reaction mixture was subsequently heated at 100° C. until an NCO content of 26.1% was reached. Then the temperature was lowered to 90° C. and the reaction mixture, following the addition of 360 mg of zinc(II) bis(2-ethylhexanoate), was stirred until the NCO content was 24.3%. After 360 mg of isophthaloyl dichloride had been added, the excess hexane 1,6-diisocyanate was removed by thin-film distillation at 0.5 mbar and 140° C. A clear, colorless product was obtained having an NCO content of 5.9%, a viscosity of 2070 mPa·s (23° C.) and a residual free HDI content of <0.03%.

Preparation of Prepolener 2

1003.4 g of hexane 1,6-diisocyanate were first admixed with 40 mg of isophthaloyl dichloride and then the mixture was heated to 100° C. with stirring. At that point, over the course of 3 hours, 796.3 g of a polytetramethylene glycol (polytetrahydrofuran, number average molecular weight 2000 g/mol, OH number 56, theoretical functionality 2) were added. The reaction mixture was subsequently heated at 100° C. until an NCO content of 26.0% was reached. Then the temperature was lowered to 90° C. and the reaction mixture, following the addition of 140 mg of zinc(II) bis(2-ethylhexanoate), was stirred until the NCO content was 24.2%. After 140 mg of isophthaloyl dichloride had been added, the excess hexane 1,6-diisocyanate was removed by thin-film distillation at 0.5 mbar and 140° C. A clear, colorless product was obtained having an NCO content of 5.9%, a viscosity of 17,300 mPa·s (23° C.) and a residual free HDI content of 0.06%.

Preparation of Prepolymer 3

77.3 g of hexane 1,6-diisocyanate were first admixed with 4 mg of isophthaloyl dichloride and then the mixture was heated to 100° C. with stirring. At that point, over the course of 3 hours, 122.7 g of a polypropylene glycol were added which had been prepared by DMC catalysis (base-free) (unsaturated groups content <0.01 meq/g, number average molecular weight 4000 g/mol, OH number 28, theoretical functionality 2). The reaction mixture was subsequently heated at 100° C. until an NCO content of 18.0% was reached. Then the temperature was lowered to 90° C. and the reaction mixture, following the addition of 20 mg of zinc(II) bis(2-ethylhexanoate), was stirred until the NCO content was 16.7%. After 20 mg of isophthaloyl dichloride had been added, the excess hexane 1,6-diisocyanate was removed by thin-film distillation at 0.7 mbar and 140° C. A clear, colorless product was obtained having an NCO content of 3.2%, a viscosity of 3189 mPa·s (23° C.) and a residual free HDI content of <0.03%.

Preparation of Prepolymer 4

Comparative Example

At 100° C. 321.4 g of hexane 1,6-diisocyanate were admixed over the course of 5 hours, with stirring, with 378.4 g of a polypropylene glycol which had been prepared by DMC catalysis (base-free) (unsaturated groups content <0.01 meq/g, number average molecular weight 2000 g/mol, OH number 56, theoretical functionality 2). Thereafter the mixture was heated at 100° C. with stirring until an NCO content of 20.7% was reached. Following the addition of 140 mg of dibutyl phosphate, the excess hexane 1,6-diisocyanate was removed by thin-film distillation at 0.5 mbar and 140° C. A clear, colorless product was obtained having an NCO content of 3.15%, a viscosity of 1596 mPa·s (23° C.) and a residual free HDI content of <0.03%.

Allophanate 1

Comparative Example

A polyisocyanate containing allophanate groups was prepared starting from a primary alcohol and HDI, and had an NCO content of 19.7% and a viscosity of 415 mPa·s (23° C.).

Preparation of Polyaspartic Ester 1

344 g (2 mol) of diethyl maleate were added dropwise at 50° C. with stirring to 210 g (2 eq.) of 4,4'-diaminodicyclohexylmethane. When the addition was complete the mixture was stirred at 60° C. under an $N_2$ atmosphere for 90 h, with dewatering at 1 mbar during the last two hours. A liquid product was obtained having an equivalent weight of 277 g.

Preparation of Polyaspartic Ester 2

344 g (2 mol) of diethyl maleate were added dropwise at 50° C. with stirring to 238 g (2 eq.) of 3,3'-dimethyl-4,4'-diaminodicyclohexylmethane. When the addition was complete the mixture was stirred at 60° C. under an $N_2$ atmosphere for 90 h, with dewatering at 1 mbar during the last two hours. A liquid product was obtained having an equivalent weight of 291 g.

Production of Coatings

Prepolymers 1 and 2 and allophanate 1 (comparative example) were mixed at room temperature with amino-functional polyaspartic esters 1 and 2, respectively, at an NCO/NH equivalent ratio of 1.05:1. Corresponding films were then applied to a glass plate using a 150 μm doctor blade. The composition and properties of the coatings are summarized in Table 1.

Whereas prepolymers 1 and 3 containing allophanate groups gave clear, flexible and tack-free films after 24 h, prepolymer 4 (without allophanate groups) did not exhibit complete curing (same NCO content as prepolymer 3).

TABLE 1

Examples 1 to 6 - Compositions and film properties

| | Examples | | | | | |
|---|---|---|---|---|---|---|
| | 1 | 2 | 3 | 4 | 5 | 6 |
| Polyaspartic ester 1 [g] | 27.9 | — | 27.9 | — | 41.4 | — |
| Polyaspartic ester 2 [g] | — | 29.0 | — | 29.0 | — | 43.5 |
| Prepolymer 1 [g] | 70.0 | 70.0 | — | — | | |
| Prepolymer 2 [g] | — | — | 75.0 | 75.0 | | |
| Allophanate 1 [g] | | | | | 33.6 | 33.6 |
| NH:NCO | 1:1.05 | 1:1.05 | 1:1.05 | 1:1.05 | 1:1.05 | 1:1.05 |
| Potlife | 24 min | 5 h 10 min | 38 min | 6 h 18 min | 10 min | 10 min |
| Pendulum hardness: (150 μm wet film) | | | | | n.d. | n.d. |
| After 7 d | 32" | 40" | 49" | 56" | n.d. | n.d. |
| Shore hardness D: DIN 53505 | | | | | n.d. | n.d. |
| After 7 d | 27 | 18 | 16 | 13 | n.d. | n.d. |
| Tensile strength ISO EN 527: | | | | | n.d. | n.d. |
| Breaking stress: (MPa) | 2.4 | 1.6 | 1.1 | 1.0 | n.d. | n.d. |
| std. dev. | 0.3 | 0.01 | 0.1 | 0.06 | n.d. | n.d. |
| Nominal breaking extension: (%) | 51.8 | 65.1 | 45.6 | 57.6 | n.d. | n.d. |
| std. dev. | 11.5 | 5.5 | 4.7 | 4.8 | n.d. | n.d. |
| Tear propagation tests DIN 53515: | | | | | n.d. | n.d. |
| (N/mm) | 3.3 | 2.3 | 1.9 | 1.5 | n.d. | n.d. |
| std. dev. | 0.3 | 0.4 | 0.4 | 0.2 | n.d. | n.d. | n.d. not determined.

Potlife is the time within which the compositions can still be processed to a film.

Prepolymers 1 and 2 containing allophanate groups were similar in structure except for the different polyethers used for their preparation. Due to their high compatibility, high functionality and good flexibilizing properties, films were obtained which within 24 h were non-tacky, flexible, tough and clear.

To the contrary with allophanate 1 curing was very rapid, but the films obtained were so brittle that it was impossible to determine any mechanical properties.

Curing Tests

The prepolymers 1, 3 and 4 (comparative example) were mixed at room temperature with amino-functional polyaspartic ester 1 at an NCO/NH equivalent ratio of 1.05:1. After mixing the clear compositions were cast into films 3 mm thick. The composition and the curing behavior of the films are summarized in Table 2.

TABLE 2

Examples 7 to 9

| | Examples | | |
|---|---|---|---|
| | 7 | 8 | 9 |
| Polyaspartic ester 1 [g] | 18.4 | 7.4 | 9.2 |
| Prepolymer 1 [g] | 49.3 | — | |
| Prepolymer 3 [g] | — | 36.8 | |
| Prepolymer 4 [g] | | | 45.2 |
| NH:NCO | 1:1.05 | 1:1.05 | 1:1.05 |
| Potlife [min] | 35 | 60 | 150 |
| Curing (after 24 h) | yes | yes | no |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component coating composition comprising
A) a polyisocyanate prepolymer having polyether groups attached via allophanate groups and
B) an amino-functional polyaspartic ester of formula I)

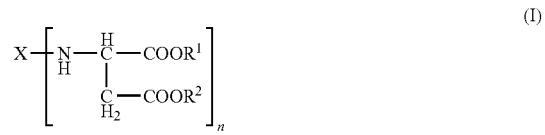

wherein
X is an n-valent organic radical obtained by removing the primary amino groups from an n-valent polyamine,
$R^1$ and $R^2$ are identical or different organic radicals which are inert towards isocyanate groups under the reaction conditions and
n is a whole number of at least 2;
wherein said polyisocyanate prepolymer A) is prepared by reacting
A1) an aliphatic and/or cycloaliphatic polyisocyanate with
A2) a polyhydroxy component comprising at least one polyether polyol to provide an NCO-functional polyurethane prepolymer and subsequently subjecting the urethane groups of said NCO-functional polyurethane prepolymer to partial or complete allophanatization by reacting it with A3) an aliphatic or cycloaliphatic polyisocyanate, which is the same or different from polyisocyanate A1), in the presence of an allophanate catalyst and optionally a stabilizer.

2. The two-component coating composition of claim 1, wherein A1) and A3) said aliphatic and/or cycloaliphatic polyisocyanates used to prepare the allophanate modified polyisocyanate prepolymer A) comprises hexane diisocyanate (hexamethylene diisocyanate, HDI), 4,4'-methylenebis(cyclohexyl isocyanate) and/or 3,5,5-trimethyl-1-isocyanato-3-isocyanatomethylcyclohexane (isophorone diisocyanate, IPDI).

3. The two-component coating composition of claim 1, in which component A1) and component A3) comprise the same polyisocyanate.

4. The two-component coating composition of claim 1, wherein A4) said catalyst comprises one or more zinc(II) compounds.

5. The two-component coating composition of claim 4, wherein said zinc(II) compounds comprise zinc(II) bis(2-ethylhexanoate), zinc(II) bis(n-octoate), zinc(II) bis(stearate) or mixtures thereof.

6. The two-component coating composition of claim 1, wherein A2) comprises exclusively one or more polyether polyols having number average molecular weights $M_n$ of 2000 to 6000 g/mol, an average OH functionality of $\leq 1.95$ and a degree of unsaturated end groups of less than or equal to 0.01 meq/g.

7. The two-component coating composition of claim 1, wherein the equivalent ratio of the OH groups of the compounds of component A2) to the NCO-groups of the polyisocyanates from A1) and A3) is from 1:2 to 1:10.

8. The two-component coating composition of claim 1, wherein A5) said stabilizers comprise organic or inorganic acids, acid halides or esters.

9. A coating obtained from the coating composition of claim 1.

10. A substrate that has been coated with the composition of claim 1.

* * * * *